United States Patent
Kinzie

[11] Patent Number: 6,136,132
[45] Date of Patent: Oct. 24, 2000

[54] METHOD AND APPARATUS FOR THE MANUFACTURE OF THREE-DIMENSIONAL OBJECTS

[76] Inventor: Norman F. Kinzie, 45 Brentwood Cir., Needham, Mass. 02492-1903

[21] Appl. No.: 09/119,155

[22] Filed: Jul. 20, 1998

Related U.S. Application Data

[63] Continuation-in-part of application No. 08/824,286, Mar. 26, 1997, Pat. No. 5,997,681.

[51] Int. Cl.$^7$ .............................. B26B 3/06; B32B 31/00
[52] U.S. Cl. ......................... 156/258; 156/264; 156/267; 156/353; 156/511; 156/512; 156/580; 156/529; 264/158; 264/294
[58] Field of Search .................... 264/308, 401, 264/497, 317, 255, 294, 158; 156/256, 247, 529, 254, 258, 264, 267, 353, 511, 512, 580

[56] References Cited

U.S. PATENT DOCUMENTS

| | | | |
|---|---|---|---|
| 3,932,923 | 1/1976 | DiMatteo | 29/407.05 |
| 4,001,069 | 1/1977 | DiMatteo | 156/353 |
| 4,285,754 | 8/1981 | DiMatteo | 156/264 |
| 4,292,724 | 10/1981 | DiMatteo | 29/418 |
| 5,015,312 | 5/1991 | Kinzie | 156/63 |
| 5,354,414 | 10/1994 | Feygin | 156/630 |
| 5,590,454 | 1/1997 | Richardson | 29/527.4 |
| 5,776,409 | 7/1998 | Almquist et al. | 264/401 |

*Primary Examiner*—Linda L. Gray

[57] ABSTRACT

A method and apparatus for constructing a three-dimensional object. There is provided a lamination unit for holding and pressing a block of material, a slicing unit for cutting the block to form a horizontal layer having a first working surface and a cut block having a second working surface; a profiling means for profiling at least one of the working surfaces into at least one planar element; and an electronic means for receiving XYZ information corresponding to the shape of the object, for processing the XYZ information into a plurality of computerized cross-sectional representations of the shape and for controlling the operation of the lamination means, the slicing means, and the profiling means. Formation occurs by providing the electronic means with the XYZ information, placing the block in a position for holding the first working surface and the cut block having the second working surface; profiling at least one of the working surfaces to form the planar element having a shape corresponding to the computerized cross-section representation at that slicing level; pressing the second working surface of the cut block against the first surface of the horizontal layer using the lamination means; and repeating the slicing and profiling steps until the object is formed. In another embodiment of the invention, the material holding, support and shaping means are used to fabricate objects which do not require lamination.

6 Claims, 10 Drawing Sheets

METHOD AND APPARATUS FOR THE MANUFACTURE OF THREE-DIMENSIONAL OBJECTS

This application is a continuation-in-part of application Ser. No. 08/824,286, filed Mar. 26, 1997, now U.S. Pat. No. 5,997,681.

TECHNICAL FIELD

This invention relates generally to improvements in methods and apparatus for forming three-dimensional objects and surfaces from planar cross-sectional shapes and more particularly to techniques which employ the "cut-on-the-stack" method of laminating each layer and then performing selective printing and cutting operations on that layer, whereby three-dimensional objects and surfaces can be accurately and economically fabricated with predetermined shape. In addition, this invention relates to methods of material holding and material cutting, which are useful in the machining of complex shapes, both laminated and unlaminated.

BACKGROUND OF THE INVENTION

During the 1970's and 1980's, improvements in computer technology greatly facilitated the description, manipulation, and representation of complex three-dimensional information in digital form. This progress was particularly dramatic in the area of computer aided design (CAD). Methods of physical fabrication, however, were almost exclusively limited to old subtractive methods which were adapted for computer numerical control (CNC). Consequently, a number of people noted the great disparity between the ability to describe and represent complex three-dimensional information in digital, nonphysical, form and the ability to turn those descriptions into correspondingly detailed physical forms. This disparity between nonphysical and physical capabilities led an increased number of researchers to focus on a variety of new techniques which promised to provide fast and economical three-dimensional "hard copy," with little or no constraint on complexity.

A substantial amount of early freeform lamination work was accomplished by DiMatteo, in the late 1970's, and manifested in U.S. Pat. Nos. 3,932,923, 4,001,069, 4,285,754, 4,292,724, and related patents. This body of work includes the disclosure of various computerized ways of cutting and stacking material, at separate stations. It also suggests the use of a temporary supporting shell, which is constructed with parting lines, bonded, and sometimes further subdivided. Concepts of varied layer thickness and angled cutting, later advanced as "adaptive slicing," were also disclosed. These cut-off-the-stack methods were not successfully commercialized. Apparently, this freeform fabrication work went largely unnoticed, with the exception of U.S. Pat. No. 3,932,923, DiMatteo's first patent.

Much of the subsequent history of freeform fabrication and laminated object manufacturing (LOM) is generally outlined in U.S. Pat. No. 5,354,414 to Feygin. This patent suggests various methods of forming objects from layers of powder and from layers of sheet material. Of particular relevance to the current application are methods of "cut-on-the-stack" lamination which were added as new material on Oct. 4, 1989. These methods substantially reduce registration problems, by laminating a layer of material before cutting that layer of material to shape. In some embodiments described, it was also suggested that the surrounding material be left in place, in order to help support subsequent laminations. In each sheet-lamination embodiment, the thickness of the sheet material is determined and formed prior to lamination.

The lamination work which I began in 1986 was not described in the background to U.S. Pat. No. 5,354,414. This work focused exclusively on the lamination of sheet material and led to U.S. Pat. No. 5,015,312, disclosing "cut-on-the-stack" lamination. It also led to the paper "Three-Dimensional Printing," dated Apr. 27, 1988 and subsequent editions, which were widely and nonconfidentially distributed to people who were involved in this field. These lamination papers develop the "cut-on-the-stack" method to include simultaneous construction of a detachable supporting shell. In each embodiment, the thickness of the sheet material is determined and formed prior to lamination. Additional methods of lamination from preformed sheet materials are included in my U.S. patent application Ser. No. 08/587,103, abandoned, and in my pending U.S. patent application Ser. No. 08/824,286, now U.S. Pat. No. 5,997,681. Methods of cutting angular corners are disclosed in my U.S. Provisional Patent Application No. 60/046,831, abandoned. These are all hereby fully incorporated by reference herein, as though set forth in full.

There are a number of drawbacks to each of the lamination and machining methods and to the related apparatus which have been disclosed to date. First, the drawbacks which apply to all of the lamination methods, include:

A. Additive fabrication methods create objects by adding material in discrete increments. This creates the dilemma of either accepting undesirable discontinuities, or "stairsteps," in the surface or of reducing the increment size to a point which makes fabrication time and cost excessive for many purposes. Since laminated object manufacturing is a hybrid which also uses subtractive methods, it has the potential to entirely eliminate stairsteps and other unwanted discontinuities in shape. However, the subtractive mode is not yet fully exploited. The vertical-edge cutting of the current LOM hybrids cannot yet produce shapes which are equal in accuracy and smoothness to the shapes produced by conventional, purely subtractive, milling machines.

B. Since both the geometry and the use of laminated objects vary widely, it is advantageous to be able to vary the sheet thickness, both within one laminated object and between successive laminated objects. Since laminated objects are currently fabricated from sheetstock which is created by an entirely separate process, however, it is impractical to provide preformed sheet materials in every thickness which may be determined to be optimal for a particular layer. The conventional LOM approach to using preformed sheet materials is to supply sheet material which is thin enough for the most complicated portions of a particular project and to accept the inefficiencies of using a thinner-than-optimal material in less demanding portions of the project. When relatively simple objects are fabricated from thinner-than-optimal layers, the time penalty of unnecessary lamination is cumulative over many layers. In "cut-on-the-stack" apparatus material thickness changes are only made when absolutely required, with manual intervention. In the more complex "cut-off-the-stack" apparatus, changes in thickness may be somewhat easier, but are severely limited by the supply stock which is available.

C. One way to achieve optimum layer thickness is to use a variation on "layer-planing" operations which are fundamental to related methods of freeform fabrication, such as those employed by Sanders Prototype, Inc. of Wilton, N.H., and Cubital, Ltd. of Raanana, Israel. The LOM variation on this method would laminate a thicker sheet than required and then create a new "working plane" on a layer of optimum thickness by removing the excess portion of material. This alternative increases the percentage of raw material which must be discarded as waste.

D. When laminated layers are thin, they have little structural strength or resistance to deflection perpendicular to the slicing plane. This weakness makes support of cantilevers and bonding of layers particularly critical. This increases the need for excess material to be left in-place for structural support and increases the need for selective bonding, to facilitate detachment of the excess material. The need for support also creates special problems at internal voids.

E. The lamination of certain materials offers special functional potential beyond visualization and prototyping. Unlike the papers and plastics most commonly used in current lamination machines, the cutting and bonding characteristics of materials such as metals and green-state ceramic and metal powders may make it especially helpful to be able to adjust the relative usage of additive versus subtractive modes of fabrication. Especially when precision and smoothness are important, it may be advantageous to minimize the "additive mode" by reducing the number of laminations to a minimum, while simultaneously maximizing the "subtractive mode" by increasing the amount and sophistication of cutting done at each level.

F. With conventional LOM machinery, all automated cutting must be done layer-by-layer. Due to the difficulty of positioning and holding the product on a suitable automated subtractive cutting machine, any final shaping operations must be accomplished by hand. Such manual operations are expensive, time consuming and vulnerable to error.

G. All fabrication processes are subject to unanticipated errors. Prior-art lamination machines lack the capability to remove and replace an unacceptable layer or layers; they generally require that errors be corrected by disposal of an entire product and repetition of each and every layer.

H. When laminated objects are built from preformed sheet materials, there are special difficulties involved in uniformily pressing and bonding sheets which are nonplanar.

Second, there are drawbacks which are specific to methods which cut cross-sectional shapes at a special cutting station and then assemble composite shapes at a lamination station, including:

I. When cutting and lamination are accomplished at separate stations, as in the CAM-LEM methods, there is a separation of crucial operations. These methods require the separate "gripping" of each newly cut sheet and then the transfer, placement and lamination of that individual sheet. The many grip-and-place operations, at least one for each layer, increases the opportunity for error. For certain purposes, however, the CAM-LEM methods offer important new options, including the fabrication of individual object layers from more than one material.

J. When cutting and lamination are accomplished at separate stations, there are special problems associated with cutting severely sloped edges. These are largely due to the lack of structural strength and support of the extreme edges, where material thickness approaches zero. In the case of laser-based machines, there is sometimes the additional problem of the condensation of vaporized material on a surface which must still be bonded. Additional difficulties may be encountered in ensuring uniform support and lamination pressure where severely sloped edges must be bonded.

K. Various algorithms have been developed in order to better approximate complex surface shapes. To date, however, it appears that no such publicly disclosed method can adequately handle changes in surface slope which do not occur along slicing planes. While this may not be significant for minor slope changes, it is a potentially serious limitation at severe slope changes, such as from a positive slope to a negative slope. If such lines of change are horizontal, the slicing plane may be adjusted to correspond, but if such lines of change are sloped, as in the thread of a screw, more sophisticated cutting capability will be required.

Third, there are drawbacks which are specific to methods which exclusively "cut-on-the-stack," including:

L. When all cutting is done on-the-stack, it is most natural to cut only one layer at one time. Although it is theoretically possible to have more than one cutting tool working on that layer, there are severe practical limitations to the obvious alternatives. Consequently, cut-on-the-stack lamination is an inherently "serial" process, like other prior-art additive fabrication methods in which one layer is fabricated at a time. Unobvious methods of parallel fabrication are one subject of my pending U.S. patent application Ser. No. 08/587,103.

M. Cutting on-the-stack has limited lamination apparatus to one accessible working plane for each lamination. This is because the opposite side of each lamination is bonded to the previous layer before any operations can be performed on it. This limitation will become more significant as lamination machinery is adapted to profile cross-sections with edge cuts which are not vertical.

Fourth, there are drawbacks which are specific to methods which use rotating cutting tools for the purpose of milling shapes, whether such shapes are laminated or unlaminated, including:

N. Complex shapes are often configured in such as way that it is difficult to perform milling operations on all of the appropriate surfaces. Such subtractive cutting operations are often made possible by the use of elaborate and specialized work-holding fixtures. These fixtures sometimes require special design and fabrication and therefore add significantly to the cost and time required for precision milling of complex shapes. This factor is particularly significant for the production of a relatively small number of units, as might be required for early product testing or for replacement of a failed functional component.

O. Shapes which are appropriate for production by machining with round cutting tools often include sharp angular corners. In some cases these corners are located or oriented in a ways which render them difficult or impossible to cut by subtractive rotating tools.

For all of the above reasons, there is a clear need to improve LOM and machining processes, particularly in the areas of quality of output, efficiency, versatility, speed and reliability of production. The present invention clearly fulfills all of these needs.

SUMMARY OF THE INVENTION

Briefly, and in general terms, the present invention provides a new and improved method and apparatus for layer-by-layer fabrication. In a presently preferred embodiment, by way of example and not necessarily by way of limitation, the method and apparatus has many advantages over previously disclosed embodiments of laminated object manufacturing. Many of these advantages result from the following features:

A'. The new fabrication method allows the use of subtractive cutting to be optimized for each material, geometry and product purpose. At one extreme, when the subtractive mode of this invention is maximized, the method is nearly indistinguishable from conventional five-axis CNC milling, because the additive mode is reduced to a single lamination. Although the apparatus must be different, in order to enable both addition and subtraction, there is no reason why this novel apparatus could not also be utilized for the entirely conventional CNC milling of a single block of material. At the other extreme, when the additive mode is maximized, because the layers are extremely thin and the subtractive cutting uses only three axies, much of the method appears superficially similar to conventional LOM. In between these extremes, the method will optimize the complementary use of 1.) lamination for special variations in geometry and/or materials and 2.) cutting for fastest and most accurate fabrication of smooth shapes.

B'. The method described herein includes the lamination of an entire block of supply stock, instead of a single sheet. The added material can then be sliced at the optimum level, in order to separate it from the supply stock and thereby create a bonded layer of material. This allows just-in-time customization of layer thickness. When geometry is simple, and suitable to the subtractive cutting capabilities of the specific apparatus, layer thickness can be maximized and lamination count and time minimized. When product complexity requires, however, the layer thickness can be reduced accordingly. This means that time does not have to be wasted on unnecessary laminations.

C'. The new "cut-on-the-stack" sheet slicing method allows the creation of optimum layer thickness without the waste which would be required by the "layer-planing" methods available from the prior art, which cut and dispose of excess material.

D'. The ability to customize layer thickness allows relatively thick layers to be used when appropriate. In some situations, their strength will eliminate the need for construction of support structure. When the supporting shell is rendered unnecessary, there will be less need to provide the capability to selectively bond each layer, so as to maintain detachability from a surrounding support shell; uniform bonding will be acceptable. Furthermore, greater layer strength will facilitate the construction of objects with internal voids, without temporary support of any kind.

E'. When materials are relatively difficult to bond but easy to shape, or when precisely smooth shaping is a priority, laminations can be reserved for only the special conditions which absolutely require them. This may be illustrated by the lamination of metal tooling with the minimum number of layers required to fabricate the special features, such as internal cooling channels, which present special difficulties for subtractive cutting. Difficult bonding steps, using high pressure and/or high temperature, would be reduced while conventional five-axis CNC milling would be used to greatest advantage. Moreover, thick layers will allow the option of "spot bonding," or of conventional mechanical fasteners, instead of the full-layer bonding generally required by thin-layer lamination. In the extreme case of diffusion bonding, the incorporation of layer-slicing capability may also help reduce the problems of oxidation and/or contamination of the bonding plane.

F'. When CNC milling tools and lamination machinery are combined to create shapes without a completely surrounding support structure, it will be possible to supplement layer-by-layer cutting with final shaping of accessible exterior portions of the product. Depending on geometry and other factors, this feature may be used to smoothly and accurately "finish" products which have been "roughed" during layer-by-layer fabrication. This final milling will be facilitated by support structures which are designed by special software, constructed during lamination and then cut away in special sequence, as final finishing permits.

G'. The method and apparatus of this invention will allow the detection and removal of portions of the product which fail to meet quality standards. When the unacceptable layer (s) have been sliced off and disposed of, lamination and shaping can continue with minimal loss of time and materials.

H'. When the laminated product and the supply block can both be shaped during fabrication, it will be possible to join them with a bonded surface which is nonplanar, without customization of the pressing apparatus itself. For certain uses and machines, this will also add the advantage of being able to introduce preformed sheet materials at selected levels within the fabrication process. These preformed sheet materials might add special structural characteristics, such as the strength of long-fiber composite reinforcement, along critical portions of the product.

I'. At least one embodiment of the invention, using interchangeable carriages to carry supply material, adds the capacity to bond and slice layers of material from supply blocks of different materials. Unlike prior-art cut-off-the-stack methods, this will allow each material to be held in accurate and repeatable position, through use of specially designed pallets, or carriages. This eliminates the need to grip and release each planar element and reduces the risk of error.

J'. When cutting is delayed until after lamination, the difficulties of severe edge slope will often be reduced. This will either be because of sufficient structural support from adjacent layer(s) or because the sharp edge angle has been eliminated by cutting the previous layer in nonplanar fashion, so as to receive the following layer in a partially "inlaid," or "let-in" fashion.

K'. The various cutting alternatives of this invention will allow many complex shapes to be cut in more accurate and smoother approximations of the defining geometry. Besides the use of different cutting tools, these alternatives include; a.) cutting before lamination, b.) cutting after each lamination, and c.) cutting after multiple laminations. Such options will even meet the challenge of smoothly shaping sharply defined features which slope through slicing planes, such as screw threads.

L'. When cutting is done "off-the-stack," as in some embodiments of this invention, multiple possibilities open up. These include multiple cutting stations which can simultaneously work on different layers, cutting those layers from one or more supply materials. This potentially adds the speed advantage of "parallel processing," in which more than one layer is under construction at a given time. This could also add the "fault tolerance" of parallel processing, in which multiple work stations are networked in a fashion which allows the work load to be redistributed when one unit fails.

M'. Certain embodiments of this invention allow a combination of cutting on-the-stack and off-the-stack. In apparatus which is not sophisticated enough to take advantage of the parallel processing options, this will allow profiling of layers which are thicker and/or more complex in edge shape than would be possible with only cutting on-the-stack. This is because two working planes are exposed, instead of just one, for each planar element which is constructed.

N'. The material handling methods of this invention allow the rigid, and versatile, support of complex shapes. This will allow the automated fabrication of shapes without the need for additional work-holding fixtures. Such shapes may be produced from one or more layers of material, with or without laminations.

O'. New methods of using cutting tools will allow the production of sharp angular corners under a wider range of configurations and circumstances than previously considered practical.

BRIEF DESCRIPTION OF THE DRAWINGS

In the drawings wherein like reference numerals represent like parts.

DETAILED DESCRIPTION OF PREFERRED EMBODIMENTS

Figure 1:
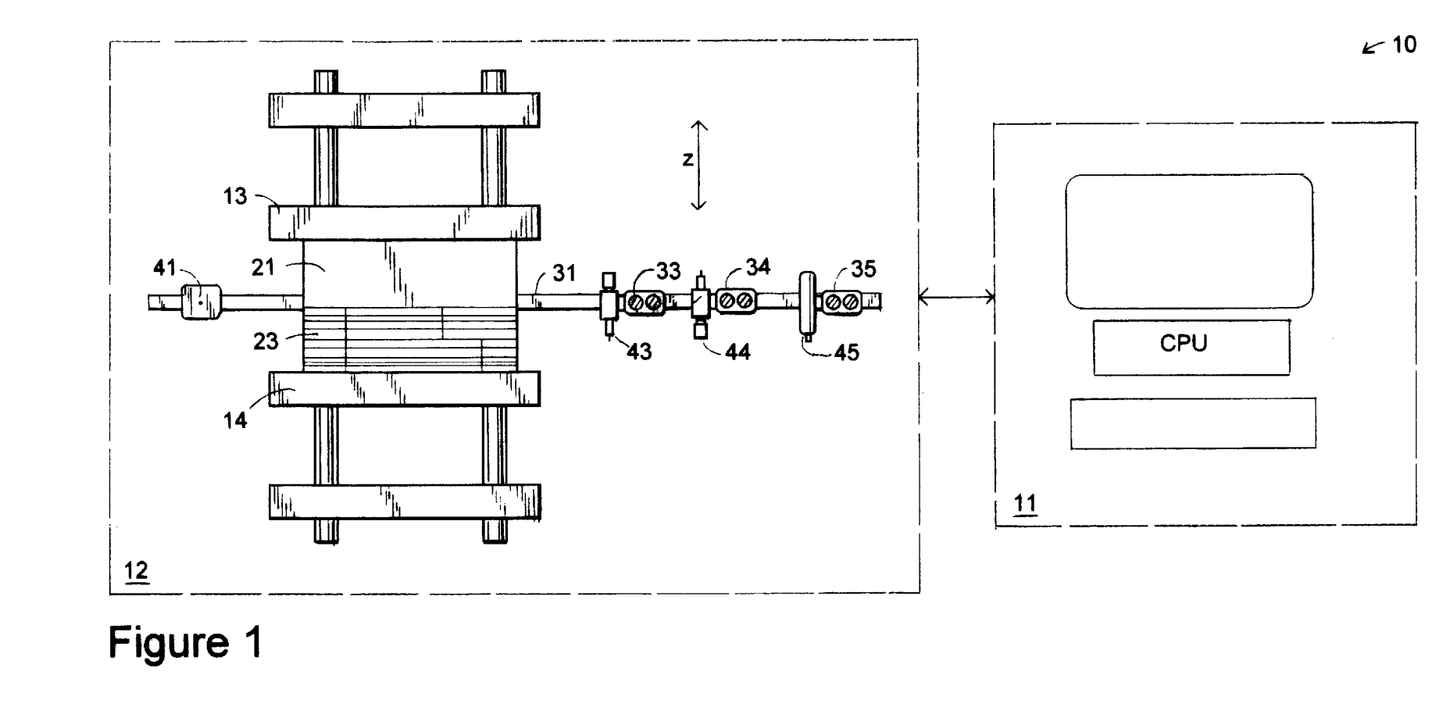
FIG. 1 is a cross-sectional view of the apparatus, showing the lamination of a supply block of material to a stack of laminated layers.
Figure 2:
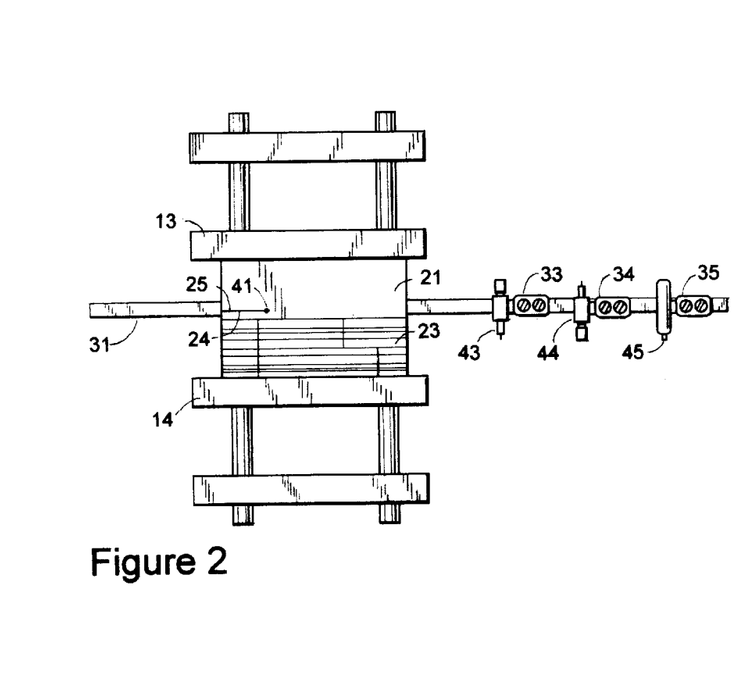
FIG. 2 is a cross-sectional view of the apparatus shown in FIG. 1, illustrating the use of a horizontal hot wire to slice a bonded layer of material free from the supply block above.
Figure 3:
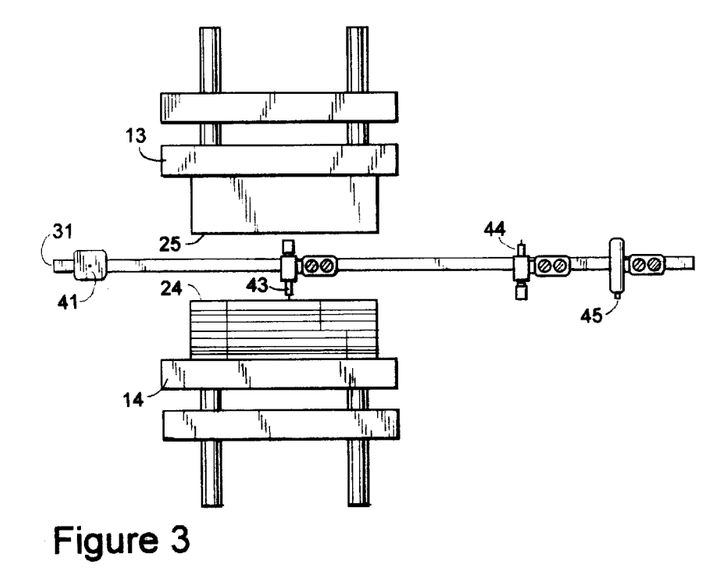
FIG. 3 is a cross-sectional view of one embodiment of the invention, illustrating the action of one XY cutting tool.

Referring now to the drawings, FIGS. 1–3 show simplified cross-sectional views of one embodiment of an apparatus for the manufacture of three-dimensional objects according to this invention. The method of this invention involves a repetitive cycle of addition and subtraction. In general illustration of this cycle, FIG. 1 shows the addition of a block of supply material 21 by lamination; FIG. 2 shows the creation of a new working plane 24, by the subtractive slicing of excess supply material, FIG. 3 shows hot-probe 43 moving over the working plane 24 as required to profile a planar element, by subtractive cutting of excess material. The three-dimensional object is thereby constructed from a series of individually contoured laminations.

Focusing now on FIG. 1, the apparatus is identified by reference numeral 10. Apparatus 10 includes a computer station 11 and a fabrication station 12. For ease of viewing, portions of the apparatus not pertinent to the invention are not shown.

Computer station 11 includes components for the input, storage, processing and display of data. The data includes XYZ information, corresponding to the shape of the three-dimensional object taken over a plurality of different cross-sections and constituting a computerized representation of each of the cross-sections. The data is analyzed to determine the preferred combination of additive and subtractive methods, based on information regarding specific capabilities and limitations of both the material and the apparatus. Fabrication is planned so that at levels of the object where geometry or change of material require the addition of material by lamination and the creation of a new working plane, an entire block of material is added by lamination. The computer hardware and software for the planning and coordination of operations are not a part of this invention. Computer station 11 is connected to the fabrication station 12.

Fabrication station 12, in FIG. 1, consists of upper press 13 and lower press 14. Presses 13 and 14 are both capable of controlled vertical motion and lamination pressure, provided by motors through linear actuators. In this case, a block of supply material 21 is held on upper plate 13 by some mechanical, or other, means and a product 23 is built on lower press 14 and held by similar means. Depending on the materials involved, the holding means may use methods such as pressure sensitive adhesive, suction, mechanical, or magnetic grip.

Guide rail 31 is supported beside, and at a central elevation to, apparatus 12, along with a parallel and coplanar companion rail which is not shown. Cross-rail pairs 33, 34, and 35 are configured, motorized and controlled so as to be independently capable of moving tools 43, 44, and 45 between supply material 21 and product 23. In FIG. 1, during lamination, unused tools are "parked" on one side of the lamination press or the other, so as to avoid interference with other operations. The mechanisms and controls are similar to those currently used in flat-bed style pen plotters and vinyl cutters. In the case of machines which "profile" planar elements with both vertical and sloped edges, additional elevation control will be required, either in the tool holder, the XY-tool-moving apparatus or in the Z-pressing apparatus.

In this embodiment, supply material 21 is a plastic foam which is suitable for constructing shapes which can be used for visualization and mold making. This particular foam is capable of being cut by a hot wire 41 and, alternatively, by a hot-probe 43 or 44, which consists of a highly conductive metal such as aluminum, which is heated by electricity. Supply material 21 can be bonded by means of a pressure-sensitive adhesive which is selectively applied by adhesive-jet tool 45, in areas where bond is desired.

The creation of new working planes 24 and 25 is shown in FIG. 2, in which hot wire 41 slices a layer of optimized thickness off of supply block 21. Working plane 24, on the product block 23, is considered "essential" because it is created at a level which is determined by computer analysis in order to allow the required operations to be executed, according to the capabilities of the specific apparatus and the characteristics of the specific supply material. In contrast, working plane 25 is created at the same time but is considered "optional," because it does not necessarily have to be utilized.

Referring now to FIG. 3, some operations are executed on working plane 24 and other operations on working plane 25. Specifically, hot-probe 43 is shown profiling portions of product block 23. Subsequently, but not shown, hot-probe 44 will be instructed to profile portions of supply block 21, in preparation for the next lamination. This profiling can be used to facilitate the creation of certain shapes and to allow the addition of thicker layers, that might not otherwise be practical if cut from only one working plane. In addition hot-probes 43 and 44 will be used to cut parting lines which are required to facilitate the removal of surrounding material after lamination is complete.

FIG. 3 also shows applicator tool 45 which is designed to apply materials which are required to facilitate the required bonding between layers. In this embodiment, tool 45 is applying a pressure sensitive adhesive in areas where additional material is to be added by lamination. Bonding agent can be applied to either working plane, before or after profiling. The characteristics of the specific material and apparatus will determine which option is used.

Figure 4A:
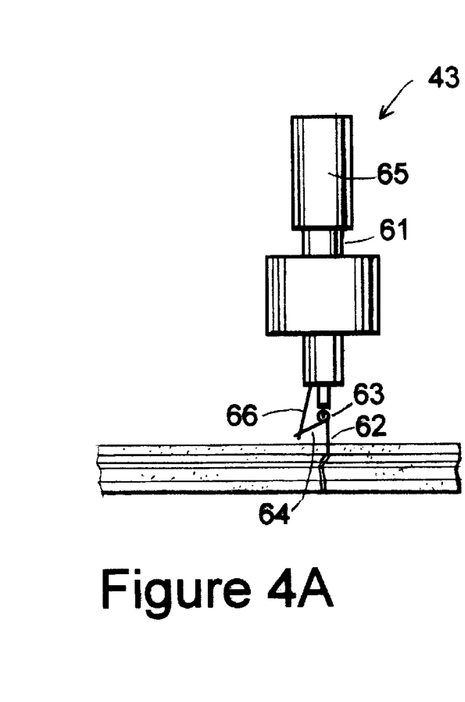
FIG. 4A is an elevational representation of a special two-axis hot-probe cutting device, for movement by an XY motion apparatus.
Figure 4B:
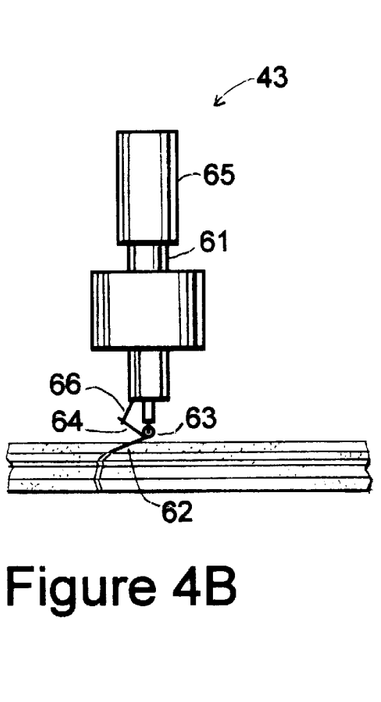
FIG. 4B is an elevational view of the hot-probe shown in FIG. 4A, illustrating inclination of the hot-probe from vertical.

FIG. 4A and 4B show details of hot-probe 43, cutting a vertical cut and cutting a sloped cut. Probe 43 consists of a barrel 61, which can be rotated by a motor which is not shown (but is similar to methods commonly used with tangential knives), a electrically heated tip 62 which is pivoted at 63 and equipped with a lever arm 64. A semi-rigid linkage, 66, connects the lever arm, through barrel 61, to a small linear actuator 65 which rotates with the barrel. Under direction of computer, and in conjunction with the elevational mechanisms of press 10 this assembly is capable of constructing planar elements by cutting contour cuts to shape cross-sections and also capable of cutting parting lines to facilitate the removal of excess material. When appropriate, the perimeters, or contours, of the planar elements may be profiled with simple vertical cuts or with compound curves (cut at varying angle to vertical). It should be noted that the profiled cross-sections are considered planar elements even though they never exist in unattached form.

Figure 5:
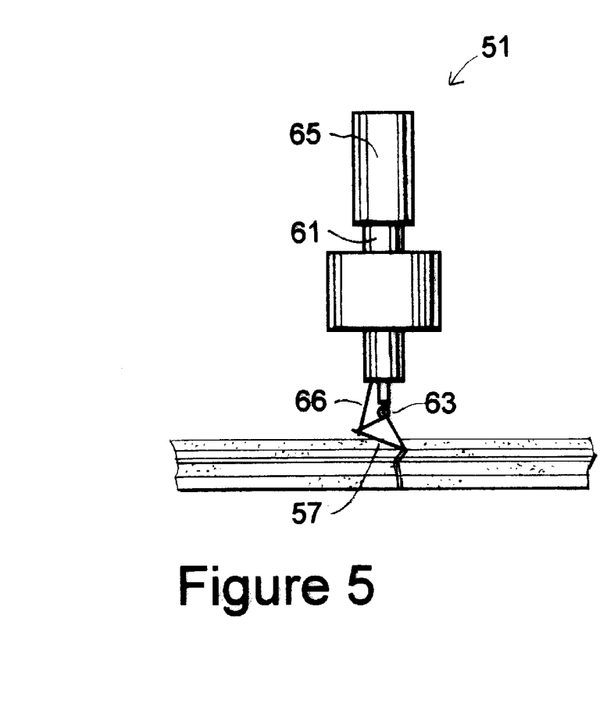
FIG. 5 is an elevational representation of a special two-axis hot-plane shaping device, for movement by an XY motion apparatus.

FIG. 5 shows a tool variation called a hot-plane 51, which can be used, with a mechanism similar to that of tool 43, to create more shallow, close-to-horizontal, slopes when it is appropriate. Hot-plane 51 is similar to hot-probe 43 in most mechanical respects, including barrel 61, pivot 63, actuator 65 and linkage 66. The capability of forming slopes is due to the geometry of the heated surface 57, which can heat relatively broad areas at varying angles from vertical. Affected areas of plastic foam contract away from the surface, as if they were pushed. An additional function of this tool may be to heat areas of excess foam so that they contract in a way which creates access space.

The tools of FIG. 1 can be configured in a manner which allows them to work on the growing product block 23, or on the exposed lower surface of the supply material 21. In fact, computer analysis of specific shapes may determine that it is most appropriate for some cuts to be made before bonding and some cuts to be made after bonding. When cutting is done on the supply block, before bonding (possibly involving excess cutting which damages the feedstock), the machine may be directed to "dress" the supply block after the profile is sliced off and before the following lamination is profiled or bonded. This might be accomplished by the removal of any damaged material by hot-wire 41, along with disposal by a waste-handling device not shown.

It is anticipated that most shapes fabricated by this method will have a complexity which requires at least one internal lamination, meaning that the geometry will require one bonded joint within each product shape. It is possible, however, that the method and apparatus will be utilized in the fabrication of products which do not have such complexity. These product shapes could be fabricated out of one horizontal layer of material, with form-shaping cuts applied to one or two working surfaces. Such single-layer products could be produced one-at-a-time and then unloaded, or such product shapes could be produced in a stack of product shapes and not unloaded until after subsequent shaping operations on another product. In this embodiment, the temporary support of such objects would be provided by adjacent layers of material, above and/or below, as customary in cut-on-the-stack LOM. When necessary, uncut tabs of material could also be used to tie the product to adjacent material. Furthermore, it is possible that some shapes may have a configuration which makes it advantageous to also, or alternatively, perform work through the sides of the material block, instead of exclusively by way of the horizontal surfaces, designated herein as "working planes." In this respect, the use of a custom-formed support material is more important to the practice of the invention than is the specific orientation of the geometry.

Figure 6:
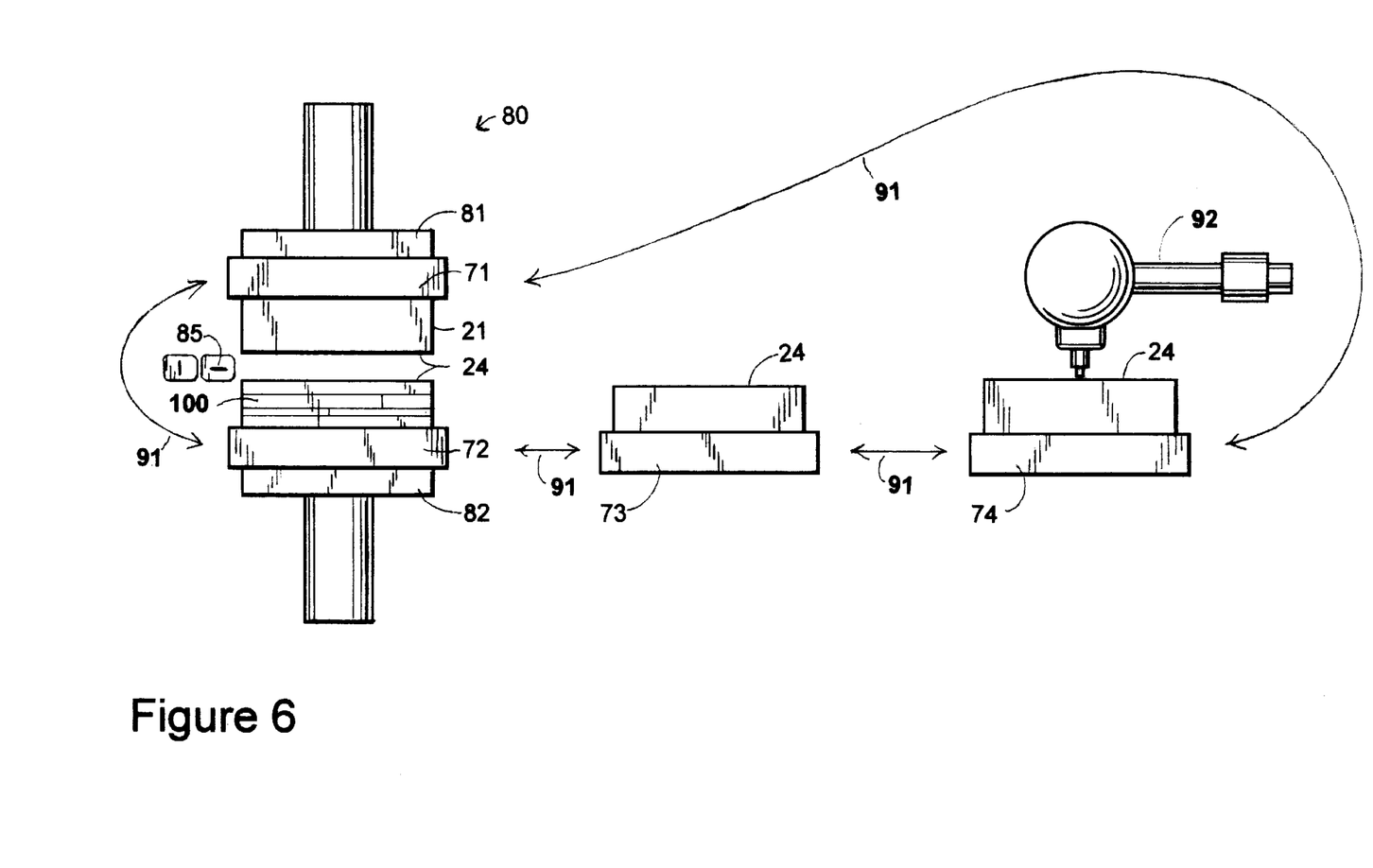
FIG. 6 is an elevational representation of another embodiment of the invention illustrating a lamination press with interchangeable material-handling pallets which are moved by conveyor mechanism between the lamination/slicing station and a cutting station.

FIG. 6 shows another embodiment of this invention. This is a variation which uses the technology of automated assembly line work cells and robotic pallet manipulation, wherein materials are mounted on carriages 71, 72, 73, 74, which can be moved between work stations, according to schematic path lines 91. At any work station each carriage can be positioned and accurately registered so as to allow highly accurate work to be performed on the materials which are carried. These carriages use a combination of mechanical and electrical devices to control and measure location and to coordinate work. Although not shown, additional work stations could simultaneously provide special capabilities and increase both speed and fault tolerance by distributing the work load. Special capabilities could include a variety of cutting devices and other tools for the performance of specialized operations at a particular layer.

In this embodiment a press station 80 is equipped with upper press 81 and lower press 82, which can hold work carriages and exert lamination pressure. The exact means of vertical motion and mechanical control are available from the prior art and are not a subject of this invention. Band saw 85 is constructed with press station 80 so as to be able to slice material at the desired elevation. In order to be able to slice through the product block 21 and allow the "return" of the circular band, the band saw may require special wheels and guides to maintain blade tension and position while the cutting portion of the band is advanced through the material being cut. In some embodiments, an additional grinding and/or polishing mechanism, or capability, may also be included in order to properly prepare surfaces for lamination.

Robot arm 92, in FIG. 6, illustrates one way to accomplish various tasks upon the working planes 24, using as many degrees of freedom as the tasks require. This robot arm may be equipped with an automatic tool changer and interchangeable tools or it may be supplemented by various other mechanical devices in order to prepare materials for bonding, by the application of a bonding agent or a bond breaker, and so as to be able to cut cross-sections and parting lines. The cutting capability may be limited to straight-line cuts (simple or compound angles) or it may be enhanced to include more complex profiles. Many existing methods of cutting tool and product manipulation are available for use, including methods which move the product being cut in simple or complex motions and methods which move the cutting tools, or suitable combinations of both.

In this illustration product 100 is being built by the layer-by-layer bonding of materials which are sliced from blocks pressed down from above. The diagram shows the configuration after a layer has been bonded and cut free from the supply stock and before the carriages, 72, 73 and 74 are moved for the next step in the cycle. The use of multiple carriages allows for shaping and bond preparation actions to be accomplished simultaneous to lamination of two sections. It also allows for a choice of different materials to be shaped and sliced from different carriages and then combined into a complex product. For instance, one carriage might carry a material of one density or rigidity and another carriage might carry a material with a different density and rigidity. As long as it is efficient and dependable, the motion method and motion path of the carriages can be varied in many ways and are not a subject of this invention.

In addition, the FIG. 6 embodiment allows the product to be built from one material and any support structure which may be necessary to be built from another material. These materials might be selected and coordinated for economy, for ease of detachment or for other function such as support during construction and/or post processing, such as pressing, heating or firing. As one side benefit of the lamination capability, it may also prove advantageous to provide supply blocks of varied cross-sectional dimension, so that the cross-section of the rough shape may be reduced, material usage, and subtractive cutting minimized. In some situations, it will be advantageous to construct a fully- or partially-surrounding shell of support material; in others it will be better to allow all the surrounding material to be cut free, removed and disposed of, without building a surrounding shell. The waste-removal mechanism may be similar to one currently used in conventional milling machines or it may include a specialized mechanical pickup device.

The embodiments of the present invention described above are intended to be merely exemplary and those skilled in the art shall be able to make numerous variations and modifications without departing from the spirit of the present invention. The wide range of potential materials used in lamination will require a similarly wide range of material handling, bonding, and cutting methods. For example, the required cutting operations could be performed by many other tools available from the prior art, including lasers, abrasive diamond saws and burrs, band knives, ball endmills, and waterjets. For some embodiments, the profile cutting could be accomplished by a miniaturized air-powered burr, modified from dental applications, for five-axis cutting motion similar to that of hot-probe 43.

Additionally, the bonding could be facilitated and accomplished by a variety of means. For example, bonding could be provided by tools which apply materials to either the exposed surface of the product or to the exposed surface of the supply block. Bonding agents which could be applied range from simple pressure sensitive adhesives to brazing powders for use with metals which are oven fired, to adhesives which are cured by radiational energy. In some cases, it may be appropriate to selectively apply a bond inhibitor, such as a protective layer or a release agent and simultaneously or subsequently apply a general coating of a volatile solvent, closely coordinated with the lamination-press step. Two-part catalytic bonding may be accomplished by applying one component to one side and another component to another side. Alternatively, the catalyst could be microencapsulated so that the adhesive is not activated until application of the lamination pressure. Attachment can also be accomplished or assisted by the use of materials which create mechanical connections, including pins, bolts, screws. Furthermore, basic attachment can be accomplished with interlocking features, additional strength might be provided with additional materials.

The apparatus described would be designed to vary the depth of lamination in order to best suit the needs of each product and the varying shape of that product with the profile cutting capabilities of the machine. With a vertical-profile cutting machine for instance, quick copies might be made with coarser layers and higher quality copies might be made with thinner layers. Certain portions of each shape might be amenable to thick cross-sections and other portions might require very fine cross-sections. Furthermore, the slicing planes do not have to be parallel or even planar; some shapes and purposes may be well served by variations from parallel-plane slicing made possible by special cutting apparatus. As one example, a band saw could slice high-density foam in curved planes. As another example, milling machinery could create more complex mating shapes, which could be designed to reduce the structural importance of a bonding agent.

In addition, the layer-by-layer processing described above can be used to facilitate other processes, in addition to the production of shape. During construction of the shape, additional tools can accomplish such tasks as installing electrical or mechanical components, print inks or other trace materials. Additionally, the apparatus would include sensors which are designed to monitor the progress and quality of work and coordinate operations so as to assure accuracy and detect errors. In case of certain problems, the machine may be equipped to slice out, or grind off, an unsatisfactory portion and then resume construction at an appropriate level. It is also clear that the methods and apparatus of this invention can also be used to cut a group of objects, at substantially the same time. These shapes can be arrayed side-by-side, or nested in an arrangement which optimizes production efficiency and material usage.

Alternative embodiments of this invention include the ability to perform additional tasks such exterior shaping, or "finishing," after the initial phase of layer-by-layer construction, or "roughing" is completed. Depending on the material and the geometry of a particular shape, in fact, certain operations might be more efficiently accomplished as part of "post processing," after the layers are assembled and critical internal, hard to access, etc. operations have been performed. This will be most practical in cases where the object can be constructed with minimal temporary support, as in the case of layers which are thick enough to support the required cantilevers. Alternatively, some operations, such as external shaping of a particular portion of a product, may be delayed only until one or a few layers have been laminated above that portion, instead of until after all laminations are complete. This strategy might allow cutting to be done with the efficiency and precision of CNC milling methods, over several bonded, but still accessible layers, but without the requirement of machining an unsupported edge near the exposed plane of next lamination.

Figure 7:
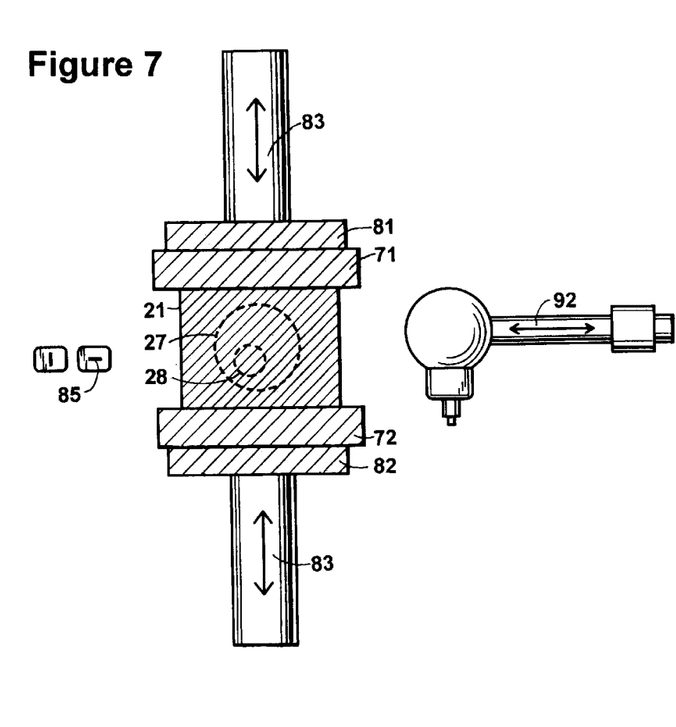
FIG. 7 is a representation of another embodiment of the invention, showing a lamination press station in section, along with an adjacent multi-axis robot-arm, shown in elevation. The location of a planned product is shown with dashed lines

A wide range of variations in material- and tool- handling methods will be apparent to those skilled in the art. FIG. 7 shows one obvious variation on the methods of manipulating, supporting, and shaping materials which have been introduced in FIGS. 1–6. In summary, FIG. 7 shows an embodiment which combines the material holding methods of the FIG. 1 embodiment with the material shaping methods of the FIG. 6 embodiment. The variation which makes this particular combination practical is the alternative provision of temporary support by an injectable material which is molded to the required shape, instead of the solid material which is cut to the required shape in the preceeding embodiments.

FIGS. 7–17 are simplified cross-sectional drawings which illustrate the overall cycle of primary operations involved in producing a sample product, spherical ball 27, which contains a spherical internal void 28. For the clarity of the basic concepts of the invention, peripheral and support elements, including computer station, motors, and some tools, are not shown.

Focusing now on FIG. 7, carriages 71 and 72 are designed to hold supply block 21 in rigid and detachable fashion. Carriages 71 and 72 may remain attached to press station 81 and 82, and may be translated along the Z axis by the up-and-down action of linear actuators 83, as directed by computer, and according to particular project requirements. In FIG. 7, the outline of the spherical ball 27 is shown by dashed line in the location in which it is to be fabricated. Robot arm 92 is equipped and located for the performance of a variety of operations, using various tools, which are provided by an automatic tool changer which is not shown. In this particular embodiment robot arm is equipped with the five axies of motion appropriate for complex movements. Robot arm 92 may also be equipped with sensing and inspection devices as required to control the quality of the product. Band saw 85 is constructed and supported as is required to slice the supply block 21 along a horizontal plane.

Figure 8:
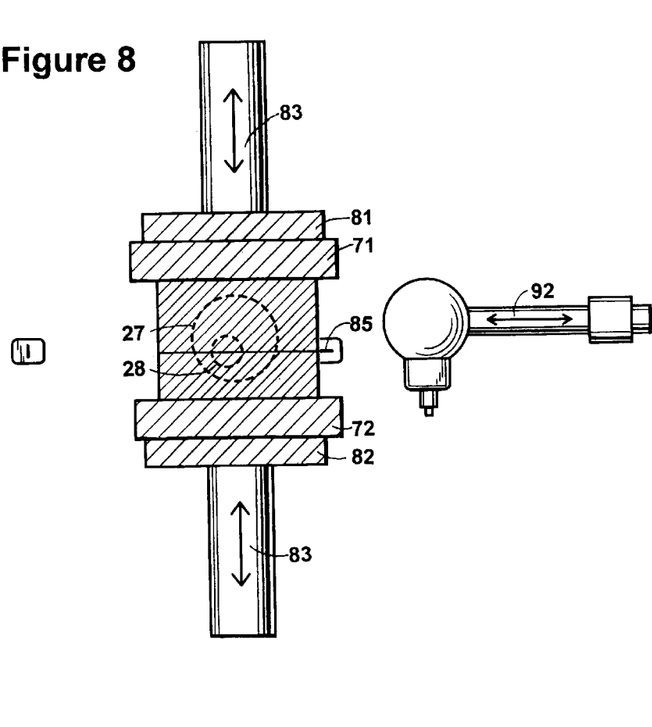
FIG. 8 shows, in section and elevation, the apparatus of FIG. 7, after the material block has been sliced.

FIG. 8 shows band saw 85 completing a horizontal cut, dividing the supply block into two separate pieces. In this case the division is along the centerline of the planned internal void 28, in order to facilitate subtractive shaping.

Figure 9:
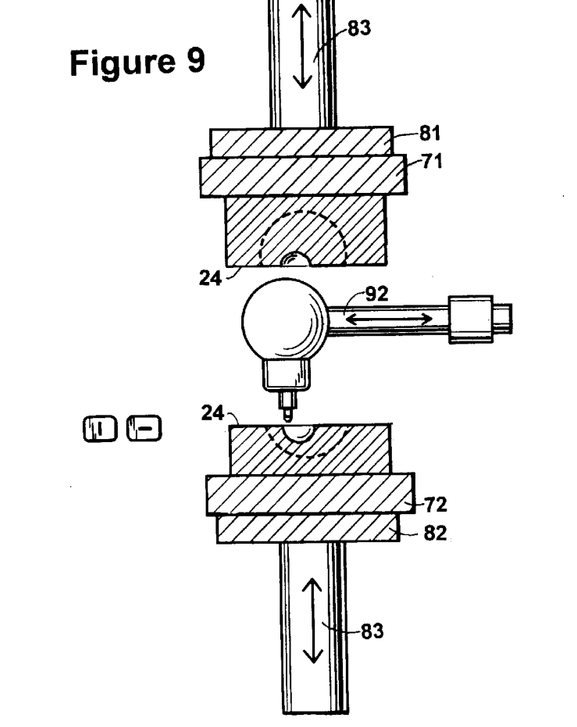
FIG. 9 shows, in section and elevation, the apparatus of FIG. 8, after the robot arm has shaped an internal void.

FIG. 9 shows the robot arm 92, equipped with a ball end mill, just after it has completed the operations required to shape the two halves of the internal void. In addition, robot arm 92 may be directed to dress the working planes 24 for lamination by surface milling to remove irregularities which exceed tolerances. Although it is not shown, the next step is for robot arm 92 to apply a bonding agent to the working planes 24, in preparation for lamination. Both the bonding agent and the application device could be one of many variations available from the prior art, and coordinated with the particular material being laminated. It should be noted that some projects may be facilitated by limiting cutting operations so as to leave temporary supports, or ties, in place around the product, in order to help achieve the structural support and rigidity required for remaining operations.

Figure 10:
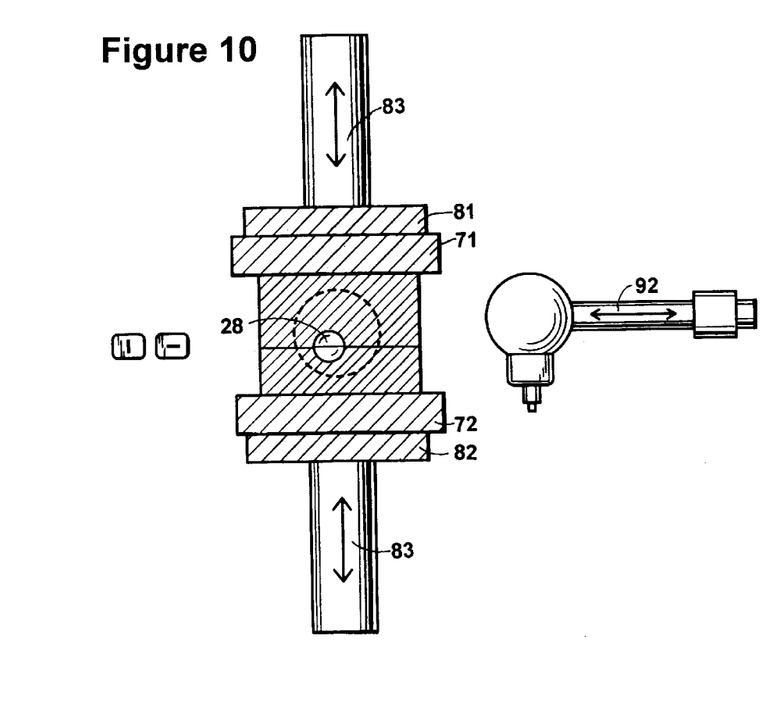
FIG. 10 shows, in section and elevation, the apparatus of FIG. 9, while the two blocks are laminated together.

FIG. 10 shows press stations 81 and 82 in the process of laminating the two separate pieces of material into one block. This lamination may depend exclusively on pressure, or it may be enhanced with some additional energy source, ranging from microwave radiation to heat.

Figure 11:
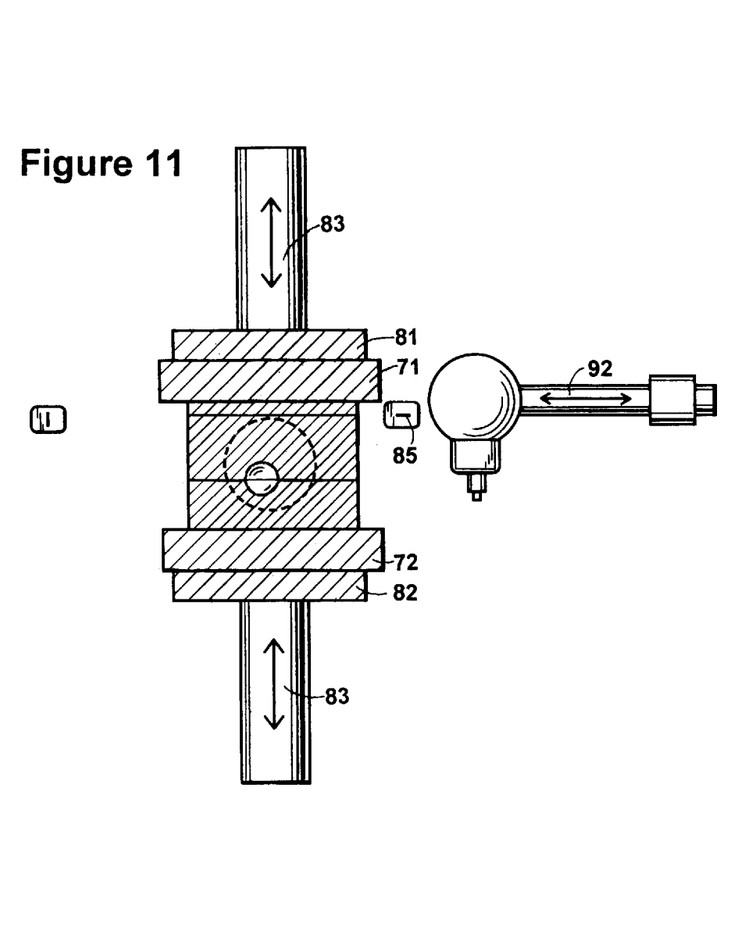
FIG. 11 shows, in section and elevation, the apparatus of FIG. 10, after the block has been sliced again.

FIG. 11 shows the band saw 85 completing a horizontal cut, dividing the block into two pieces. This cut is positioned just above the location of the planned spherical shape, so as to provide optimal access, for fabrication operations.

Figure 12:
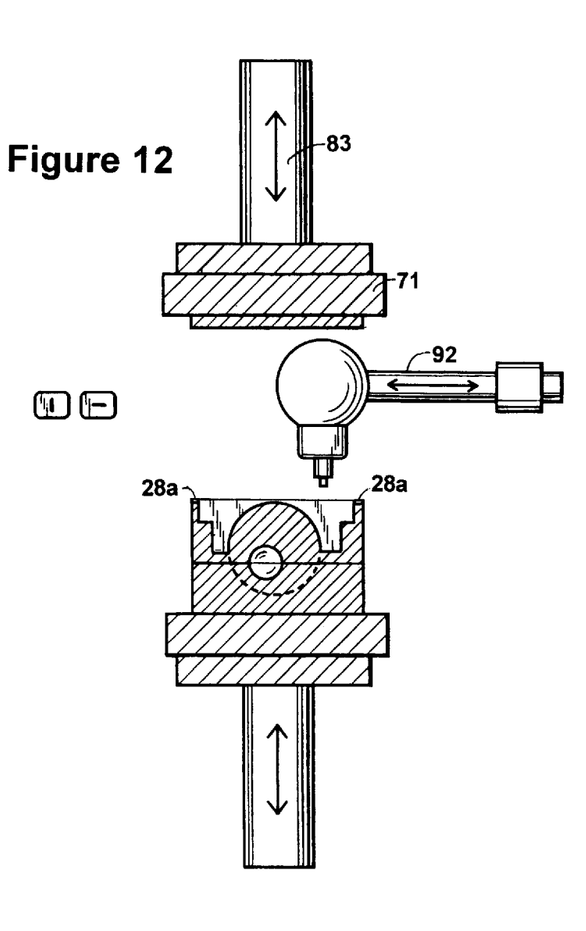
FIG. 12 shows, in section and elevation, the apparatus of FIG. 11, after the robot arm has shaped the accessible portion of the product surface.
Figure 13:
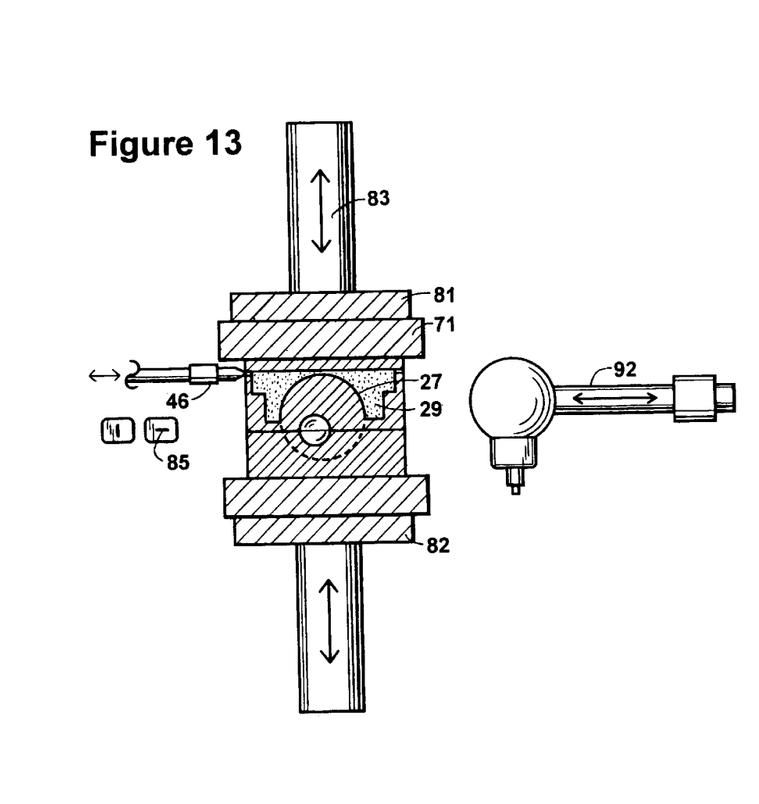
FIG. 13 shows, in section and elevation, the apparatus of FIG. 12, during the lamination and support-injection process.

FIG. 12 shows the robot arm 92 just after it has completed the various operations required to machine the external shape of one half of the planned sphere. It has also machined at least two horizontal channels 28a, in the lower working plane 24. One channel is for the later injection of support material 29, as shown in FIG. 13. The second channel, remote from the first, is for the escape of air and excess support material. Although it is not shown, the next operation is for the robot arm 92, or alternative devices, to prepare the working planes 24 for lamination by cleaning waste, smoothing irregularities, and by applying bonding agent.

FIG. 13 shows the lamination of the two blocks of material, under pressure from press stations 81 and 82. FIG. 13 also shows installation tool 46, designed for the injection of a fluid support material, capable of solidification around the shape being fabricated. In this embodiment, a support material 29 is injected into the void created by subtractive cutting of the external surface of half of spherical ball 27. Support material 29 is selected from various materials available from the prior art. Depending on project requirements, options include plastic foam, two-part catalytic resin and molten metal. This injected support material is installed as one obvious alternative to the support material which was cut and laminated from a separate supply block carried by movable carriage 73 or 74, in the FIG. 6 embodiment. This option, created by injected-in-place support material 29, reduces the number of supply blocks which is required for some fabrications and makes it possible to reduce the complexity of the material-handling apparatus. Additional variations on the temporary support include plastic material which is heated and extruded from a special tool manipulated by robot arm 92, operating in similar fashion to the extrusion heads of "Fused Deposition Modeling" marketed by Stratasys, Inc. With this method, no external enclosure would have to be provided for the containment of injected materials. Further options include some sort of external enclosure to assist in forming the temporary support material into an appropriate shape, and to reduce the required size of the supply block 21 for a given product.

Figure 14:
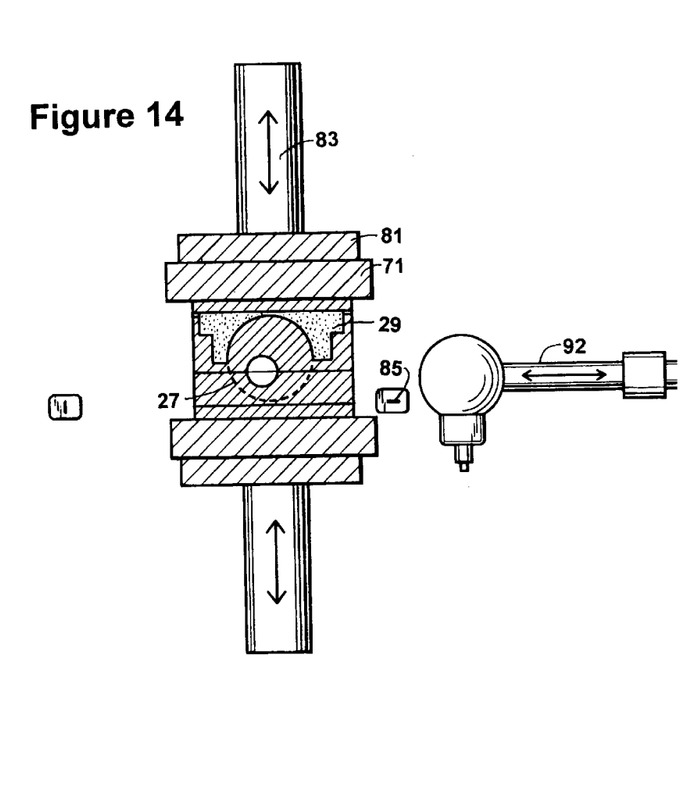
FIG. 14 shows, in section and elevation, the apparatus of FIG. 13, after the block has been sliced again.

Referring now to FIG. 14, band saw 85 is shown completing a horizontal cut which is aligned just below the exterior surface of the planned spherical ball 27. This will allow two new working planes to be made accessible.

Figure 15:
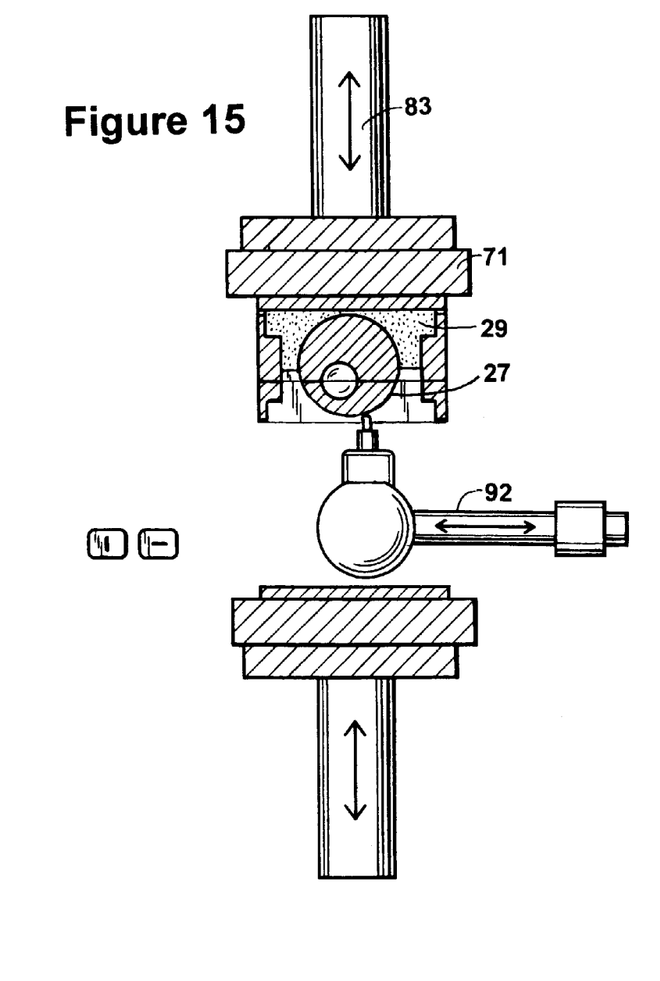
FIG. 15 shows, in section and elevation, the apparatus of FIG. 14, while the robot arm is cutting a spherical surface.

FIG. 15 shows robot arm 92 machining the second half of spherical ball 27. Upon completion, waste chips are removed by compressed air or other cleaning means not shown. At this stage, it is possible to laminate the two separate material sections together. With advance milling of fill and vent channels, it is also possible to completely support the spherical ball with another injection of a support material, similarly to the injection shown in FIG. 13. When the spherical ball is rigidly supported, additional operations could be performed, as a more complex product design might require. For example, the robot arm could use an end mill to cut away the surrounding shell of support material on one side in order to provide clearance for drilling and tapping horizontal holes and then installing a threaded rod, or other component.

Figure 16:
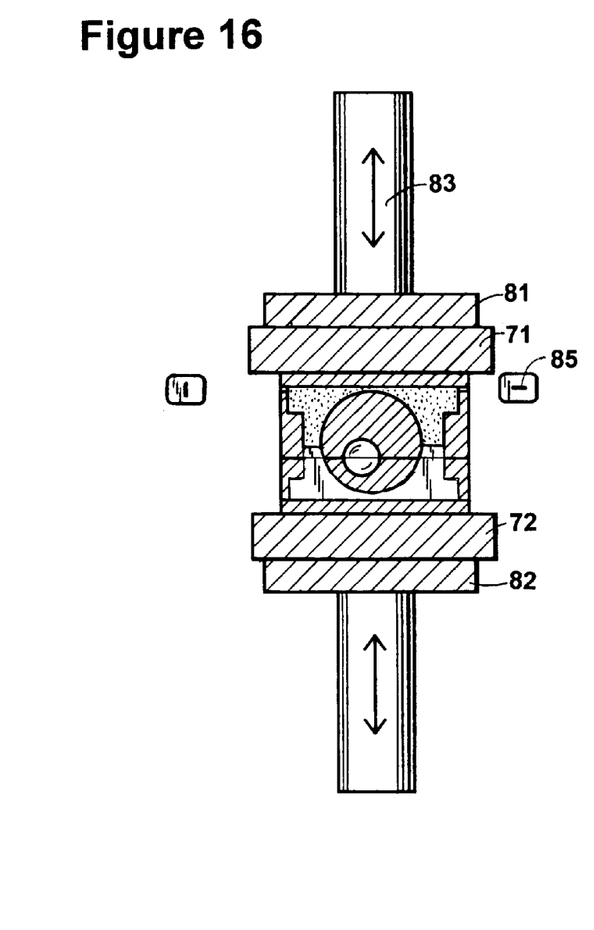
FIG. 16 shows, in section and elevation, the apparatus of FIG. 15, after the block has been sliced again.

For this relatively simple sample, however, the required spherical shaping operations are completed in FIG. 15. FIG. 16, therefore, shows band saw 85 after the completion of a horizontal cut which is located just above spherical ball 27.

This releases product block 23, which contains support material 29 and spherical ball 27. Press station 82 provides temporary support, until unloading.

Figure 17:
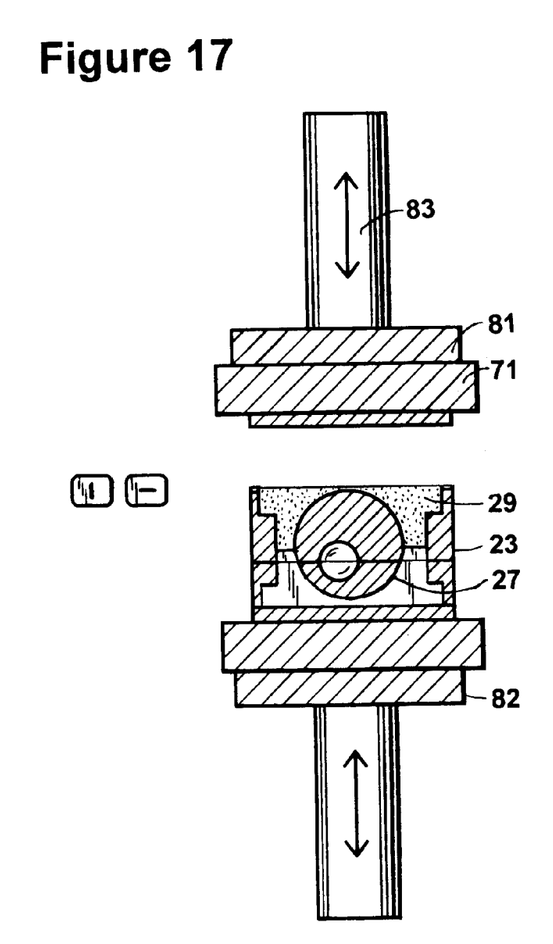
FIG. 17 shows, in section and elevation, the apparatus of FIG. 16, after the block has been released for removal from the press station.

FIG. 17 shows press station 81 raised so that the completed product block 23 can be removed, either by automated or manual operation.

Figure 18:
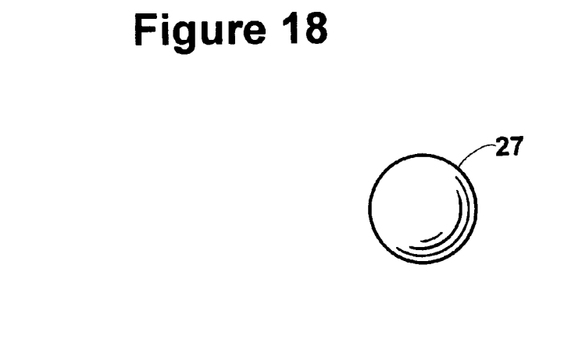
FIG. 18 shows, in elevation, the completed spherical shape, with a void hidden in the interior.

FIG. 18 shows the spherical ball 27 after it has been released from the support material by a process such as melting or dissolving support material 29. The lamination bond may be enhanced by some form of postprocessing, using heat, radiation, or other means.

Representing a further variation, press stations 81 and 82 of FIG. 7 could be equipped with rotational capability so that carriages 71 and 72 can be rotated sufficiently to advantageously orient working planes 24 toward adjacent robot arm 92 or toward a moving column, horizontal spindle, milling machine not shown. Such rotationally-equipped press stations 81 and 82 may even be designed to hold two or more carriages at one time. In this configuration, cutting might be performed on one project at the same time lamination is performed on another project.

It should also be apparent that an infinite number of variations on the spherical ball 27 product shape could be produced by the same material-handling and material-cutting methods. These various product shapes might be much more complex, requiring more internal laminations. Moreover, these product shape variations might be simpler, involving no internal laminations. In the event that no internal laminations are necessary, it's obvious that the process could be further simplified by the elimination of some or all of the slicing and lamination steps, depending on specific project needs and apparatus capabilities. For the example of shapes with no required internal laminations, the in-place slicing by band saw 85 could be made unnecessary by the provision of material blocks which are formed or cut to the proper size prior to being loaded on the apparatus. Furthermore, lamination could be made unnecessary by the use of appropriate mechanical or magnetic gripping methods, available from the prior art. In such simplified embodiments, however, it would still be necessary to use temporary support material 29, in order to hold and rigidly support products of various shapes during a portion of the cutting operations required.

In addition, the lamination and material handling methods of this invention make it possible to use a rotating cutting tool which has a cone-shaped tip in order to cut angular corners in a block of material. More particularly, the rotational axis of the conical cutting tool can be oriented obliquely to the angular faces which are intended to be cut and simultaneously oriented obliquely to the direction in which the cutting tool is advanced, or plunged, into the material being cut. Although such a plunge cut can be performed into either working plane 24, it is generally advantageous to advance the conical cutting tool into the cut block, which has not been laminated to the product shape. In this way, the portion of the material which is cut to the intended angular shape can be laminated and the portion which is not fully cut, beyond the limits of the tool motion, can be sliced off of the product, disposed of or saved for later use, in a position where the gouge will not cause a problem.

All such variations and modifications noted above are intended to be within the scope of the present invention as defined by the appended claims.

I claim:

1. A method of constructing a three-dimensional object having a predetermined shape, the method comprising the steps of:

a. providing a block of supply material,
   b. providing a lamination means for holding and pressing the block,
   c. providing a slicing means for cutting the block to form a horizontal layer having a first working surface and a cut block having a second working surface,
   d. providing a profiling means for profiling at least one of the working surfaces into a planar element,
   e. providing an installation means for providing a temporary support to a portion, or portions, of the planar element
   f. providing an electronic means for receiving XYZ information corresponding to the shape of the object, for processing the XYZ information into a plurality of computerized cross-sectional representations of the shape, and for controlling the operation of said lamination means, said slicing means, said profiling means, and said installation means,
   g. providing the electronic means with the XYZ information,
   h. placing the block in a position for holding by the lamination means,
   i. slicing the block using the slicing means to provide the horizontal layer having the first working surface and the cut block having the second working surface, the layer and the cut block each held by the lamination means,
   j. profiling at least one of the working surfaces using the profiling means to form the planar element having a shape corresponding to said computerized cross-section representation at that slicing level,
   k. pressing the second working surface of the block in step j against the layer of step j using the lamination means, installing the temporary support for said portion or portions of the planar element of step j, and then
   l. repeating said steps i, j and k until the object is formed.

2. The method of claim 1 further including the step of applying a material to facilitate bonding of the layers.

3. A method of constructing a three-dimensional object having a predetermined shape, the method comprising the steps of:

a. providing a block of supply material, having a first working surface and a second working surface,
   b. providing two gripping means for holding the block and controlling its elevation,
   c. providing a profiling means for profiling at least one of the working surfaces into a planar element,
   d. providing an installation means for providing a temporary support to a portion, or portions, of the planar element,
   e. providing an electronic means for receiving XYZ information corresponding to the shape of the object, for processing the XYZ information into a plurality of computerized cross-sectional representations of the shape, and for controlling the operation of said gripping means, said profiling means, said installation means, and
   f. providing the electronic means with the XYZ information,
   g. placing the block in a position for holding by one of the gripping means,
   h. profiling the first working surface using the profiling means to form a first planar element having a shape corresponding to said computerized cross-section representation adjacent to said working surface, i. pressing the block against the other gripping means, and installing the temporary support material, j. holding the block by the other gripping means and releasing the block from the step-g gripping means, k. profiling the second working surface using the profiling means to form a second planar element having a shape corresponding to said computerized cross-section representation adjacent to said working surface, l. releasing said block and said planar elements from the other gripping means, and m. releasing said first planar element from temporary support.

4. A apparatus for constructing a three-dimensional object having a predetermined shape, the apparatus comprising:

a. a first gripping means for holding and locating a first surface of a block of supply material, b. a second gripping means for receiving the block from the first gripping means and for holding and locating a second surface, different from the first surface, of the block, c. a profiling means for profiling the first working surface into a planar element while the block is held by the first gripping means and for profiling the second working surface into a planar element while the block is held by the second gripping means, d. an installation means for providing temporary support to a portion of at least one of the planar elements, and e. an electronic means for receiving XYZ information corresponding to the shape of the object, for processing the XYZ information into a plurality of computerized cross-sectional representations of the shape, and for controlling the operation of the first and second gripping means, the profiling means, and the installation means;

wherein the profiled elements have a shape corresponding to the computerized cross-sectional representation of the shape.

5. An apparatus for constructing a three-dimensional object having a predetermined shape, the apparatus comprising:

a. a lamination means for holding and pressing a block of material, b. a slicing means for cutting the block to form a horizontal layer having a first working surface, and a cut block having a second working surface, c. a profiling means for profiling at least one of the working surfaces into a planar element, d. an installation means for providing a temporary support to a portion, or portions, of the planar element e. an electronic means for receiving XYZ information corresponding to the shape of the object, for processing the XYZ information into a plurality of computerized cross-sectional representations of the shape, and for controlling the operation of said lamination means, said slicing means, and said profiling means to form the object.

6. The apparatus of claim 5 further including an application means for placing a material to facilitate bonding of the layers.

* * * * *